United States Patent [19]

Barker

[11] Patent Number: 5,480,122

[45] Date of Patent: * Jan. 2, 1996

[54] SHUT-OFF VALVE FOR INSTALLATION IMMEDIATELY DOWNSTREAM FROM A DEFECTIVE VALVE MOUNTED INTO THE COMPRESSION-CONNECTION TYPE OF OUTLET OF THE DEFECTIVE VALVE

[76] Inventor: Paul J. Barker, 15 Ferris Rd., Old Greenwich, Conn. 06870

[*] Notice: The portion of the term of this patent subsequent to Sep. 21, 2010, has been disclaimed.

[21] Appl. No.: 110,568

[22] Filed: Aug. 23, 1993

Related U.S. Application Data

[63] Continuation-in-part of Ser. No. 941,227, Sep. 2, 1992, Pat. No. 5,246,200.

[51] Int. Cl.$^6$ ........................................... F16K 3/22
[52] U.S. Cl. ........................... 251/148; 137/614; 251/215; 251/315.14
[58] Field of Search ..................... 251/148, 215, 251/315 SE, 315.14; 137/614

[56] References Cited

U.S. PATENT DOCUMENTS

| | | | |
|---|---|---|---|
| 958,073 | 5/1910 | Barnstead | 137/614 |
| 1,287,107 | 12/1918 | Robertson | 251/266 X |
| 1,414,118 | 4/1922 | Eller et al. | 251/266 |
| 2,039,220 | 4/1936 | Heggem | 137/556 X |
| 2,993,677 | 7/1961 | Ford | 251/148 |
| 4,508,130 | 4/1985 | Studer et al. | 137/15 |
| 4,667,928 | 5/1987 | Davatz et al. | 251/148 X |
| 4,687,180 | 8/1987 | Simonelli et al. | 251/903 X |
| 4,691,726 | 9/1987 | Studer et al. | 137/15 |
| 5,020,774 | 6/1991 | Christianson | 251/148 X |
| 5,246,200 | 9/1993 | Barker | 251/148 |

*Primary Examiner*—Gerald A. Michalsky
*Attorney, Agent, or Firm*—G. Kendall Parmelee; Parmelee, Bollinger & Bramblett

[57] ABSTRACT

A trouble-shooting shut-off valve includes an inlet-tail-tube mountable directly into a compression-fitting outlet socket of a defective shut-off valve, thus positioning the trouble-shooting valve immediately downstream from the defective valve in line in series with the defective valve. An inlet-tail-tube fitting is mounted onto an upstream end of the valve housing as a component of the valve. This fitting has an axial bore forming an upstream extension of an inlet passage in the valve housing. The inlet-tail-tube projects axially from this fitting adapted for insertion directly into such a socket in the defective valve. The inlet-tail-tube has a diameter equal to the outside diameter of flexible plumbing tubing, referred to as flex tube, and is formed of material suitable for making a compression connection thereto. An inlet end termination of the inlet-tail-tube is flat for seating down squarely into the outlet socket of the defective valve. A downstream end of the valve housing has an exteriorly-threaded boss with a valve outlet passage extending through this boss to a downstream termination of the boss. A truncated conical surface within this downstream termination encircles the outlet passage and flares outwardly adapted for engaging a compression sleeve with inward wedging action when a compression nut is screwed onto external threads of the boss for squeezing the compression sleeve in making a compression connection with a downstream flex tube.

16 Claims, 8 Drawing Sheets

SHUT-OFF VALVE FOR INSTALLATION IMMEDIATELY DOWNSTREAM FROM A DEFECTIVE VALVE MOUNTED INTO THE COMPRESSION-CONNECTION TYPE OF OUTLET OF THE DEFECTIVE VALVE

RELATED APPLICATION

The present patent application is a Continuation-In-Part of patent application Ser. No. 07/941,227 filed Sep. 2, 1992, now U.S. Pat. No. 5,246,200.

FIELD OF THE INVENTION

The present invention is in the field of shut-off valves for installation in supply lines for plumbing fixtures. More particularly this invention relates to a shut-off valve for convenient installation in-line in series with an existing defective valve being mounted into the outlet of the defective valve immediately downstream from the defective valve in a supply line leading to a plumbing fixture, such as a wash basin or toilet tank or the like. Also, this shut-off valve is adapted for serving as a high-quality, easy-to-install, premium valve unit for incorporation in a new plumbing installation.

BACKGROUND

Many plumbing fixtures, such as wash basins and toilet tanks, have water supply lines leading to them equipped with relatively small shut-off valves that plumbers refer to as "Speedy" valves. A flex tube often extends from the outlet side of the "Speedy" valve to the fixture, and this flex tube often is connected to the outlet of the small "Speedy" valve by a compression fitting. When a plumber is called upon to make a repair or replacement in such a wash basin or toilet, the first step is an attempt to shut off this existing small valve to prevent flow of water while doing the repair or replacement on the fixture involved.

It is not unusual for such a "Speedy" valve which has been in its open condition for many years to become defective by sticking in its full-open position or for its valve stem to be covered by corrosion or mineral deposits so that the handle on the stem cannot be turned completely off. Sometimes the valve seat itself becomes eroded or irregularly mineral-coated such that the valve leaks significantly, even when strenuous attempts are made by the plumber to turn the valve handle to a fully off position.

When a plumber is faced with a situation where an existing supply line valve has become defective such that it permits significant incoming water flow to continue, then the plumber must deal with two unattractive alternative procedures.

1. One alternative is to attempt to make needed repairs on a fixture while trying to use rags, sponges and buckets to staunch unwanted incoming flow of water entering through the defective existing shut-off valve. Often the plumber is working in a cramped space, lying on a floor facing upwardly underneath the wash basin or toilet tank being repaired, and it is not unusual in such situations that the incoming water is squirting into the plumber's eyes or onto the plumber's face and running down his neck.

2. The other alternative procedure is to attempt to trace back a supply pipe line for that particular fixture hoping to locate a main shut-off valve which can be used for temporarily stopping the incoming flow. In an apartment building, it is sometimes necessary for the plumber to go down into a basement so as to shut off a main riser for a whole tier of apartments, because a shut-off valve for a particular apartment (in which a fixture to be repaired is situated) is inaccessible in a locked service cabinet whose key is missing or is inoperative. When a plumber has trudged down into a basement, the plumber often finds a basement piping situation in which it is very difficult to ascertain which is an appropriate main riser valve to be turned off. Often the respective riser valves have not been tagged nor marked with identifications telling which tiers of apartments they control. Moreover, after an appropriate riser shut off valve is located and has been closed, other tenants in other apartments along that particular riser soon become annoyed by lack of water and raise complaints, while a needed repair or replacement of a fixture is being accomplished in one particular apartment.

Considerable frustrating time is lost while a plumber goes down into a basement seeking a hoped-for riser shut-off valve, experimentally turning off a promising valve, then in coming back up to the apartment only to find out that the wrong valve was turned off, necessitating another trip down to the basement, amid possible complaints from neighboring tenants, etc.

U.S. Pat. No. 1,287,107—Robertson shows valves for a steam heating system of vintage 1918. In FIG. 1 a valve plunger opens downwardly, and in FIG. 4 a valve plunger opens upwardly. FIG. 2 shows that the valve handle turns 180° between "ON" and "OFF" positions. This Robertson steam valve is cited because it happens to disclose female and male connections at 3 and 4, respectively, on "induction and eduction necks 3 and 4" (Col. 1, lines 38–39). However, both the male and female connections are threaded. Both the male and female connections are of large diameter suited for steam (gaseous) flow not of modest size as is typical for water (liquid) flow.

U.S. Pat. No. 1,414,118—Eller et al discloses a valve having a plunger 6 (FIG. 4) with a pair of ears 8 (FIG. 2) sliding in grooves 7 for preventing the plunger 6 from rotating as it is moved up and down by turning a handle 22, 23. Multiple turns of the handle are required for moving the plunger from fully closed to fully open. The inlet passage 2 is located in a neck which is both male and female threaded. The outlet passage 3 is located in a male threaded neck.

U.S. Pat. Nos. 4,508,130 and 4,691,726—Studer et al are directed to solving plumbing repair problems. Both of these patents describe solutions to plumbing repair problems. These solutions are considerably more complex and are more time-consuming than the problem-solving capability afforded by the described embodiment of the present invention. In addition, both of these prior patents involve temporary use of a main shut-off valve. Neither of these Studer et al patents discloses nor suggests a downstream repair problem where a main shut-off valve is inaccessible, inoperative or remotely located in a basement among an array of shut-off valves whose identifies or control functions are not identified. In contrast to Studer et al's repair sequence, the present invention advantageously avoids any need to seek and to shut off any main valve.

In Studer et al U.S. Pat. No. 4,508,130, FIG. 1 shows a leak at 38 in pipe 24 located in a crawl space beneath a floor 14. In order to repair this leak 38, these joint inventors describe a procedure involving a sequence of steps as follows: (A) An accessible exterior main shut-off valve 22 is closed; (B) in FIG. 2, a desired pipe-cutting location 92 is selected; (C) in FIG. 2, the pipe 24 is cut in two places at this selected position 92 so that a short length 94 of the pipe 24 can be removed; (D) in FIG. 3, the spacing of the two cuts leaves a gap 96 equal to the spacing between two socket-stop shoulders 72 (FIG. 5) of their new valve 40; (E) in FIG. 4, their new valve 40 is installed in the gap between the two cut ends of the pipe; (F) their new valve 40 has compression fittings at each end; (G) their new valve is installed and then is shut; (H) the main shut-off valve 22 now is re-opened so that water will be available elsewhere in the building; (I) the leak 38 is repaired as shown at 98 in FIG. 4; (J) their new valve 40 is now opened for leak-proof testing of the repair 98. When repair 98 has been made and tested to be leak-proof, this new valve 40 is turned permanently open. Thus, this new valve becomes part of the supply pipe.

There is no discussion nor suggestion in this Studer et al '130 Patent concerning the problems associated with attempting to make a repair downstream from a leaky localized shut-off "Speedy" valve, where a main shut-off valve is inaccessible, defective, unidentifiable or is impractical to use, because shutting it off would inconvenience too many other tenants in a large building.

In Studer et al '130 the inventors are concerned about the difficulty of repeatedly squirming in and out of a crawl space. They want to shut off the main valve 22 once. Then, they squirm into the crawl space to install and shut off their new valve 40. Then, they get out of the crawl space to open the main valve 22. Then they get back into the crawl space for making repair 98. Their new valve 40 enables them to complete and to leak-proof test their repair 98 while remaining in the crawl space and then to leave new valve 40 in a permanently full-open position. They fully assume that the main shut-off valve 22 is accessible, is fully operational and is practical for them to use for temporary shut-off purposes.

In the other Studer et al patent '726, the patentees describe a water tank 32 (FIG. 1) where the existing valve assembly 38 needs to be replaced. They are not making a repair downstream from the existing valve assembly 38; they are replacing it.

Their valve-replacement procedure is: (A) turn off an accessible main shut-off valve 22; (B) cut the inlet pipe 40 (FIG. 3) adjacent to the inlet side 48 (FIG. 3) of the existing valve assembly 38; (C) remove the existing valve by disconnecting a flex-tube connection 52; (D) install a new valve 70 using a compression fitting 74 (FIG. 5) for connection to the cut end of the inlet pipe 40; (E) connect the flex-tube connection 52 to the compression fitting at the downstream side of their new valve 70; (F) open the main shut-off valve 22.

In Studer et al '726, the patentees do not teach nor suggest that their new valve 70 is to be installed downstream from and in series with the existing defective valve assembly 38. This existing defective valve has soldered connections. Its downstream end is soldered to a short piece of pipe 68 which in turn is soldered to a downstream adapter 60 which is exteriorly threaded (male end fitting 60).

Moreover, the new valve 70 of Studer et al '726 has two male threaded ends 96 and 124. Thus, their new valve 70 is not adapted for direct connection immediately downstream from the existing valve assembly 38, since this existing valve assembly already has an adapter 60 with an exteriorly threaded male end 62 (Col. 5, lines 40–42). It will be understood that an exteriorly threaded male fitting is not directly connectable to another exteriorly threaded male fitting.

The patentees in Studer et al '726 wish to avoid making a soldered "sweat" plumbing connection close to an interior wood-stud wall 18 where the water tank is located. These inventors Studer and Schourup appear to have had considerable practical plumbing experience. Since they have not recognized the problem which the present invention has solved, namely an inaccessible, not fully operational or an impractically situated main shut-off valve, the teaching in this U.S. Pat. No. 4,691,726 serves to emphasize patentable novelty of the present invention.

SUMMARY

In accordance with the present invention, the described embodiments of the invention, which comprise the best mode contemplated by the inventor for putting this invention into practice, comprise a valve housing having inlet and outlet passages. A valve chamber interconnects the inlet and outlet passages, a movable shut-off valve element is positioned in the valve chamber. This shut-off valve element is movable between its fully open and fully closed positions. A valve stem has an inner end coupled to the valve element for moving the valve element between its fully open and fully closed positions, and a handle is mounted on an outer end of the valve stem. This new valve housing further comprises: an inlet-tail-tube fitting having a longitudinally projecting inlet-tail-tube which defines the inlet passage for the valve. This inlet-tail-tube has an outside diameter ("OD") suitable for insertion directly into a socket in the externally-threaded outlet end of a Speedy valve. This Speedy valve socket normally has a flex-line inserted therein for supplying water to a plumbing fixture, and the externally-threaded outlet end of the Speedy valve normally is connected in water-tight relationship to the flex-line by a compression sleeve encircling the flex line with a compression nut tightened upon the compression sleeve. This inlet-tail-tube of the new valve is fabricated from suitably soft plumbing material, for example such as copper or plastic, so as to be capable of making a water-tight compression sleeve and compression nut connection between this inlet-tail-tube and the externally-threaded outlet end of a defective Speedy valve. The new valve housing also comprises an externally-threaded outlet end having a compression-fitting-type of truncated conical surface therein. Thus, the outlet end of the new valve is adapted to be connected by a compression sleeve and compression nut directly to an existing flex-line or to a replacement new flex-line. The compression sleeve and nut which are used to connect the existing flex-line to the outlet end of the new valve may be the same sleeve and nut which previously had been used to connect the flex-line to the outlet end of the defective Speedy valve, or a new sleeve and nut may be used.

Also, this new shut-off valve is well adapted to serve as a high-quality, convenient-to-install, premium valve unit for incorporation in a new plumbing installation wherein compression-connection plumbing fittings are employed.

BRIEF DESCRIPTION OF THE DRAWINGS

The invention, together with further objects, features, advantages and aspects thereof will be more clearly understood from the following description considered in conjunction with the accompanying drawings which are not necessarily drawn to scale with the emphasis instead being placed upon clearly illustrating the principles of the invention. Like reference numerals indicate like elements throughout the different views.

DETAILED DESCRIPTION OF PREFERRED EMBODIMENT

Figure 1:
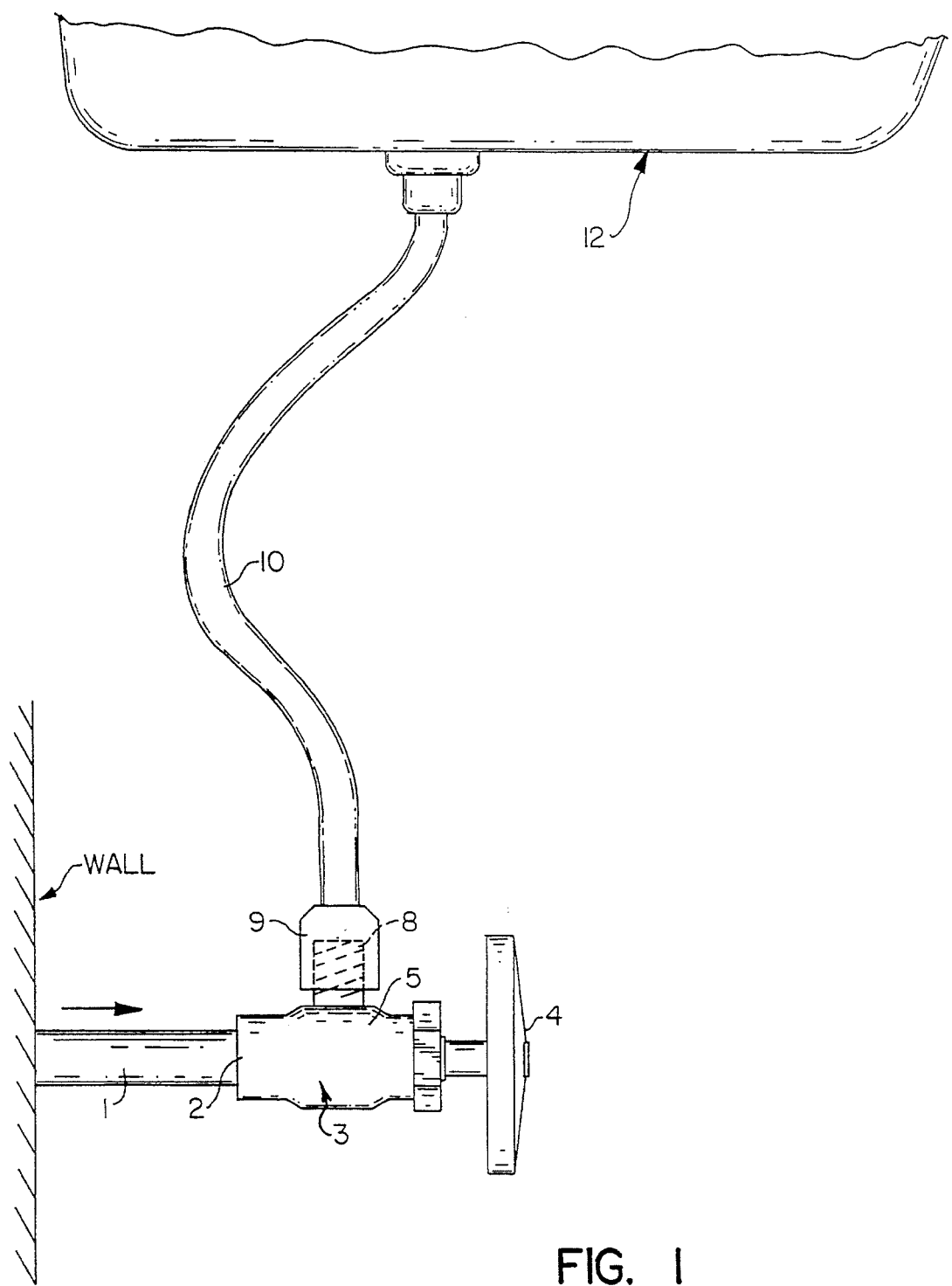
FIG. 1 is an elevational view of a plumbing installation in which an incoming supply line extends horizontally to a "Speedy" shut-off valve. A flex tube (flex-line) connects with a plumbing fixture located above the valve.

As shown in FIG. 1, an incoming water supply line 1, which may be either a cold or a hot water supply line, extends horizontally inward from a wall, for example a bathroom wall. This supply 1 feeds into an inlet 2 of an angle-stop "Speedy" shut-off valve 3 having a handle 4. The valve 3 is called an "angle-stop" valve because its outlet 5 is oriented at right angles to its inlet 2.

Figure 2:
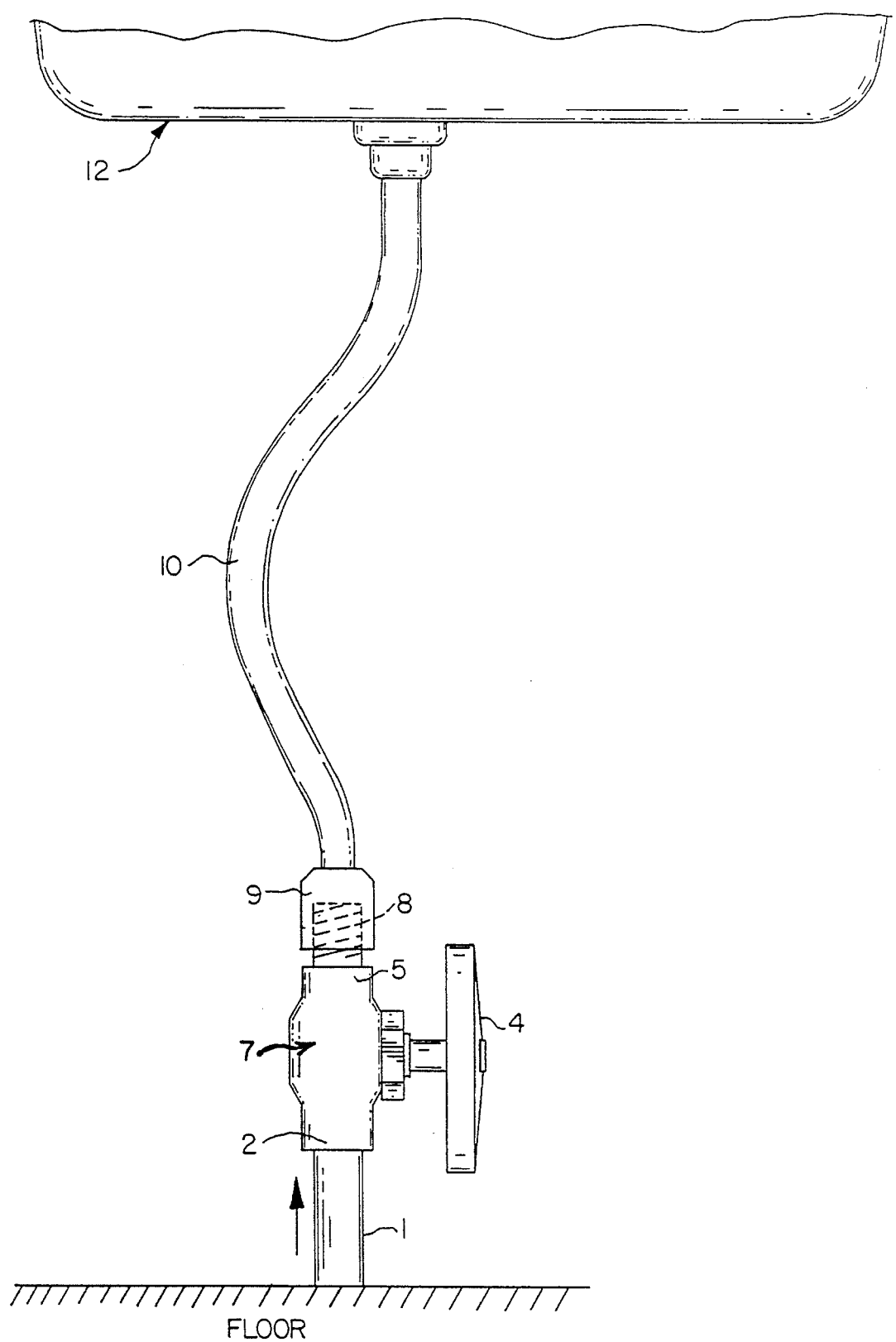
FIG. 2 is an elevational view similar to FIG. 1, except that the incoming supply line extends vertically upward from a floor.

As shown in FIG. 2, there are also "straight-through" "Speedy" valves 7 which are used when an incoming supply line 1, which may be either for cold or hot water, extends vertically from a floor, for example the floor of a bathroom.

Both valve 3 and valve 7 have an outlet 5 equipped with a screw-threaded male end 8 adapted to be joined by a compression nut 9 (and by a compression sleeve not seen within this compression nut) to a relatively flexible, bendable flex tube line 10. This flexible flow line 10 often comprises relatively small diameter, bendable tubing as is shown in FIGS. 1 and 2. For example such a flex-line 10 may be attractively coated copper tubing, such as chromium-plated copper tubing. Alternatively, such a flex-line 10 may comprise flexible plastic tubing surrounded by a protective sheath, for example a flexible sheath of braided non-corrodible wire strands. This flex-line tubing is fabricated from suitably soft material for making a water-tight connection to its lower end using a compression nut and compression sleeve as known in the art. The flex-line 10 runs up to a plumbing fixture 12, for example a wash basin, deep sink, toilet tank, or the like.

Figure 3:
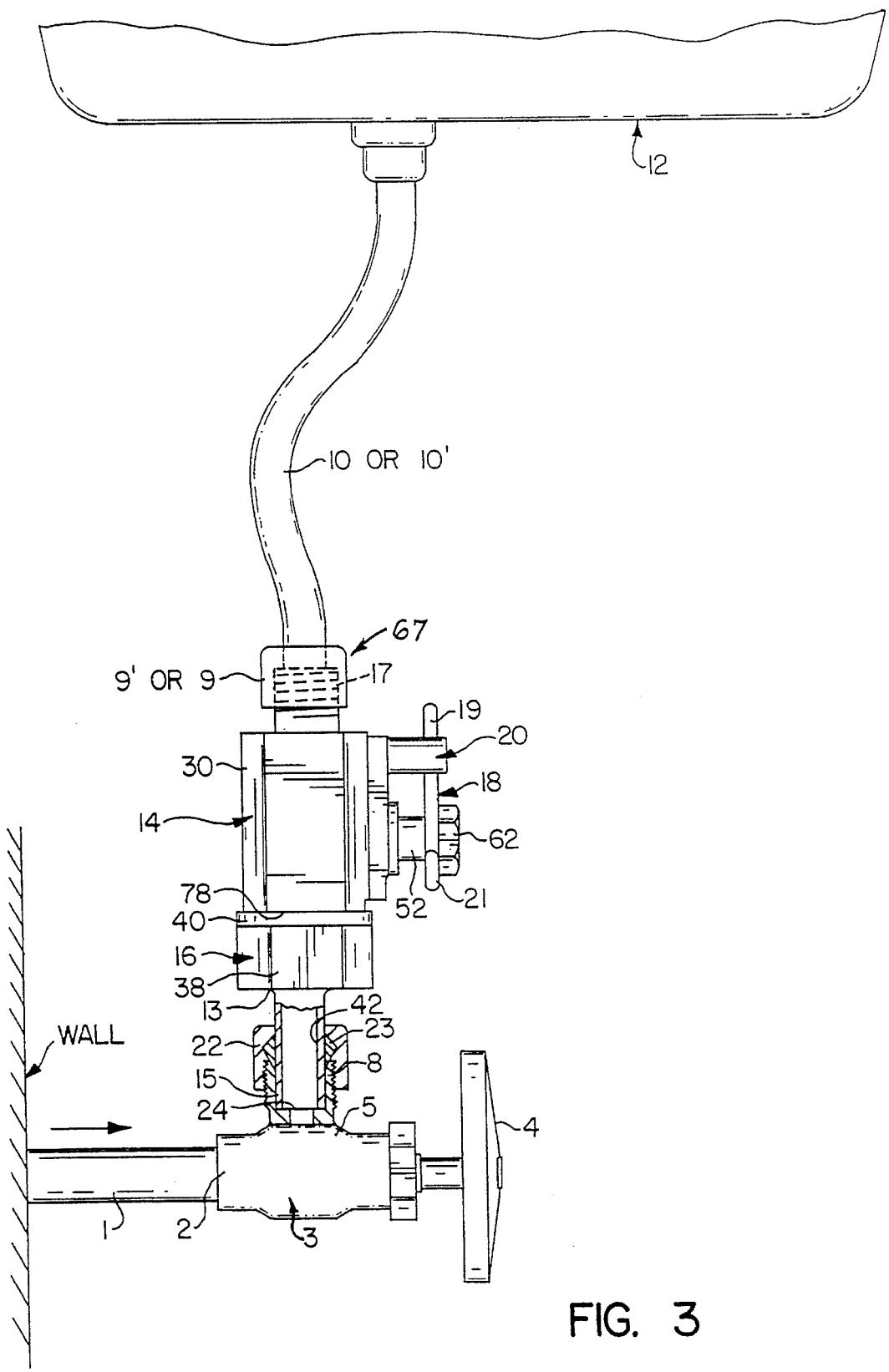
FIG. 3 is an elevational view similar to FIG. 1 showing the new quick shut-off valve embodying the present invention installed directly onto the outlet from a defective "Speedy" valve. The outlet end of the defective valve, with a compression nut and compression sleeve connected thereto, are shown in section for clarity of illustration.

In the present embodiment of the invention, a troubleshooting, quick shut-off valve 14 (FIGS. 3, 4 and 5) has a suitably soft inlet-tail-tube 15 on a fitting 16 at its inlet end 13. This inlet-tail-tube 15 defines the inlet passage into the valve 14 and is adapted to be inserted directly into the socket within the externally-threaded male outlet compression-connection-type end 8 of a defective angle-stop "Speedy" valve 3 as is illustrated in FIG. 3 or into the socket in the outlet compression-connection-type end 8 of a defective straight-through "Speedy" valve 7 (FIG. 2). As soon as the inlet-tail-tube 15 has been inserted fully, as shown in FIG. 3, into a socket outlet 24 located in the outlet end 8 of the defective Speedy valve 3 or 7, a compression-connection-type nut 22 with a compression sleeve 23 is used quickly and easily for connecting the inlet-tail-tube 15 to the compression-connection-type outlet 8.

In use and operation of the quick shut-off valve 14, a plumber first makes sure that the L-shaped valve handle 18 on a rotatable stem 52 (Please see also FIGS. 4 and 5) is turned to its fully open position (FIG. 5) with the "ON" leg 19 of handle 18 resting against a handle stop stud 20. This L-shaped valve handle 18 is shown configured with two legs 19 and 21 (respectively "ON" and "OFF" legs) oriented 90° apart. A one-quarter turn will position the OFF leg 21 against the stop stud 20, thereby shutting this valve 14.

The reason for initially fully opening this valve 14 is that the plumber has already determined that the existing "Speedy" valve 3 or 7 is defective, and significant flow is passing through this existing valve in spite of vigorous efforts by the plumber to shut it off. When significant leakage flow is occurring, it is much easier to install an open valve 14, because the plumber thereby avoids fighting water pressure which otherwise would be resisting insertion of the inlet-tail-tube 15 into the socket 24 (FIG. 3) within the externally threaded outlet end 8 of the leaking valve 3 or 7. It is quite difficult to attempt to install a closed valve against water pressure of an existing flow, and such an attempt to fight against pressure may consume considerable time and may cause unwanted sprays of water to occur. Consequently, the new valve 14 needs to be open to accommodate leakage flow for facilitating installation of the new valve as quickly as possible while avoiding opposition from water pressure. The plumber wants to save time while uncontrolled leakage flow through a defective valve is occurring and wants to avoid needless spraying of leaking water.

With the new valve 14 fully opened and at hand, and with a compression nut 22 and a compression sleeve 23 positioned in readiness on the short inlet-tail-tube 15, the plumber as quickly as possible unscrews the nut 9 (FIGS. 1 or 2) of the compression fitting which previously has been attaching the flex-line 10 to the threaded outlet 8 of the valve 3 or 7. As soon as this nut 9 begins to be loosened, there will be an amount of leakage (spurting or spraying) of water from between the sleeve and the threaded outlet 8, depending on the amount of leakage flow through defective valve 3 or 7. Quickly, the lower end of flex-line 10, together with the disconnected compression nut 9 and its compression sleeve, are temporarily shifted out of the way.

As soon as the lower end of flex-line 10 has been removed from the socket 24 (FIG. 3) and has been moved aside, the inlet-tail-tube 15 of the new valve 14, already prepared by putting thereon an encircling compression sleeve 23 with an encircling compression nut 22 resting loosely over the compression sleeve, as mentioned above, is inserted promptly into the empty socket 24. The compression nut 22 is quickly tightened for completing connection of the inlet-tail-tube 15 to the outlet end 8 of the defective valve 3 or 7. Then, the handle 18 is turned one-quarter turn putting the "OFF" arm 21 against the stop stud 20, thereby shutting off all leakage due to defective valve 3 or 7. The leakage flow has been stopped, and the plumber can proceed to make the needed repairs or replacement in fixture 12.

The plumber may decide to re-use the existing flex-line 10 and existing compression nut 9 with a compression sleeve (not seen) which is already in place on the flex-line within the interior of this compression nut 9. Alternatively, the plumber may decide to use a new flex-line 10' (FIG. 3) and a new compression nut 9' (FIG. 4) with an accompanying new compression sleeve 64 (FIG. 4) for connecting the valve 14 to the repaired or replaced plumbing fixture 12.

Figure 4:
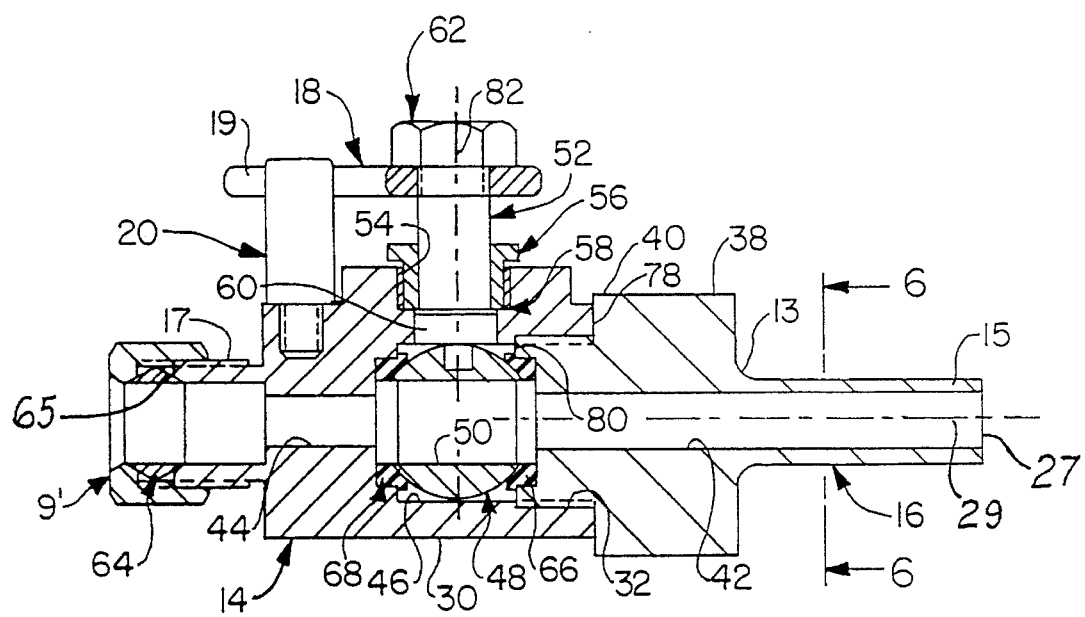
FIG. 4 is an enlarged longitudinal sectional view of a quick shut-off valve embodying the present invention adapted for installation directly onto the outlet from a defective "Speedy" valve in series relationship with the defective valve.
Figure 5:
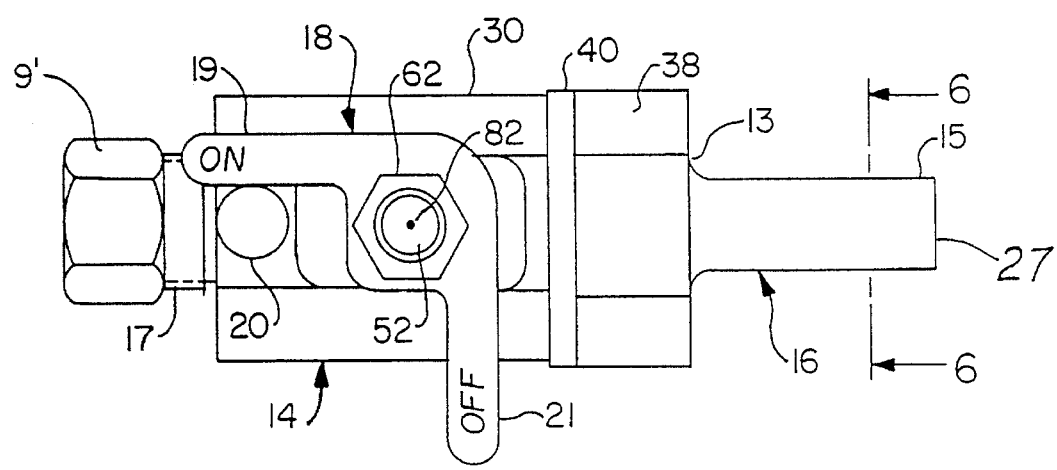
FIG. 5 is an enlarged plan view of the present quick shut-off valve shown in FIG. 4.
Figure 6:
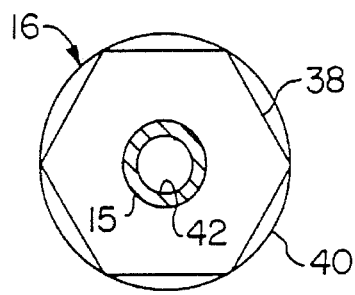
FIG. 6 is a cross sectional view taken along the plane 6—6 in FIGS. 4, 5 and 7 through a suitably soft inlet-tail-tube on an inlet fitting of the present quick shut-off valve. This inlet-tail-tube is intentionally made from a softer material (dissimilar from the material of the main body of the valve) for being suitable for making a compression connection thereto by a compression sleeve and compression nut.

As shown in FIGS. 4 and 5, the trouble-shooting, quick shut-off valve 14 includes a valve housing 30. The inlet-tail-tube fitting 16 forms the inlet end 13 for this valve, being mounted in a threaded socket 32 in the valve housing 30. The fitting 16 has a downstream protruding end portion 34 (FIGS. 7 and 8) with external screw threads 36 adapted to be screwed into this threaded socket 32.

In order to facilitate assembly of the inlet-tail-tube fitting 16 into its socket 32, a main body portion 38 of the fitting 16 may be hexagonal for providing a wrench-engageable region 38. A circular rim 40 and the contiguous shoulder surface 74 on the main body portion 38 of the fitting 16 abuts against the upstream end 78 of the valve housing 30. An axial bore inlet passage 42 extends through fitting 16, and it has an inside diameter "D" (FIG. 7) corresponding with the conventional inside diameter (I.D.) of a flex-line 10 or 10', for example having a nominal I.D. in a range from about 0.32 of an inch to about 0.21 of an inch, depending upon whether the inlet-tail-tube 15 is made from copper or plastic, or the like, suitably soft malleable material. A copper tail-tube 15 has a bore 42 in the upper portion of this size range, while a plastic tail-tube has a bore in the lower portion of this size range for providing a slightly thicker tubing wall of plastic as compared with copper. The outside diameter "E" of the inlet tail-tube 15 corresponds with the conventional outside diameter (O.D.) of a flex-line 10 or 10', for example having a nominal O.D. of ⅜ths of an inch (a nominal value of 0.375 of an inch). Thus, the O.D. and physical characteristics of the tail-tube 15 are very suitable for making a compression-type connection thereto using a conventional compression nut 22 (FIG. 3) with a conventional compression sleeve 23.

Figure 7:
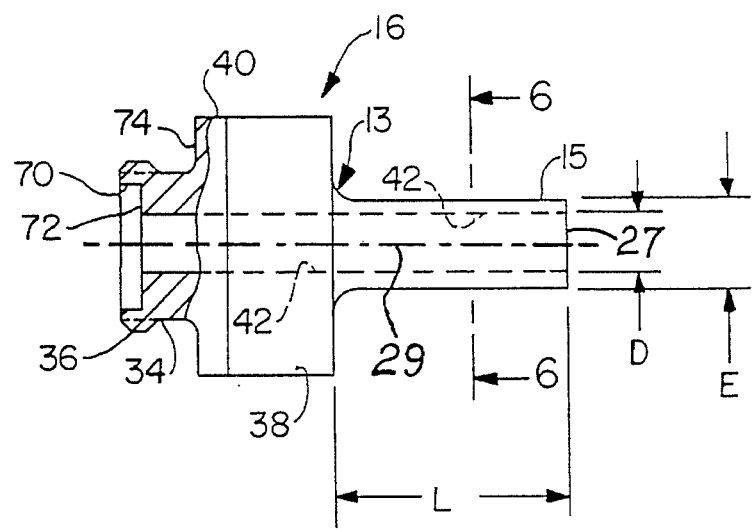
FIG. 7 is a longitudinal view, partly in section, showing the inlet-tail-tube and the tail-tube fitting seen previously in FIGS. 4, 5 and 6.

To make the inlet-tail-tube 15 well suited for applying a compression sleeve 23 and compression nut 22 thereto, this tail-tube is fabricated from suitably soft, malleable material, for example such as copper or plastic similar to copper, for example such as the plastic used for fabricating a flex-line 10 or 10'. A convenient method of manufacturing this suitably soft, malleable tail-tube 15 is to make the whole fitting 16 as an integral component all fabricated from the same material, as is shown in FIGS. 4 and 7. Thus, the fitting 16 as a whole may be softer than the material, for example brass, of which the valve housing 30 may be fabricated.

Alternatively, the tail-tube 15 itself may be fabricated from a desired material suitable for a compression connection thereto, for example soft copper, and then this tail-tube may be permanently suitably bonded at the inlet end region 13 to the main body portion 38 of the fitting 16. The main body portion 38 and its downstream protruding end portion 34 may be fabricated from material corresponding with the material of which the housing 30 is fabricated.

The valve housing 30 has an outlet passage 44, and between this outlet passage and the inlet passage 42 is a valve chamber 46, which interconnects the inlet and outlet passages 42 and 44. Within the valve chamber 46 is positioned a quarter-turn rotatable valve element 48, for example shown as a ball, having a through bore 50 for connecting the inlet and outlet passages when this rotatable element is turned to the "ON" position, as is shown in FIGS. 4 and 5. A rotatable valve stem 52 is mechanically coupled to the rotatable element 48 for turning it into its "ON" and "OFF" positions. This valve stem 52 is shown captured in the valve housing 30 by a nut sleeve 56 screwed into a threaded opening 54 in which the valve stem is located. A washer 58 is held by the nut sleeve 56, and this washer rests against an annular shoulder 60 on the valve stem 52 for capturing it in the opening 54. A locknut 62 is threaded onto the outer end of the valve stem 52 for securing the handle 18 to the valve stem. Another advantage of this L-shaped handle 18 is its compact shape for enabling the valve 14 to fit into a relatively small available space between an existing valve 3 or 7 and a nearby plumbing fixture 12. For example its legs 19 and 21 may be no more than about one and a half inches long, and yet this two-legged handle enables a strong torque to be applied by hand to the valve stem 52.

Figure 8:
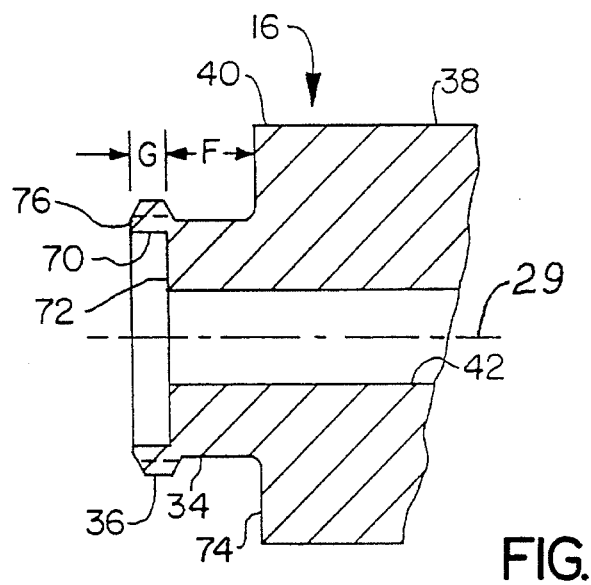
FIG. 8 is a further enlarged longitudinal sectional view of a recessed downstream end portion of the inlet-tail-tube fitting of FIGS. 6 and 7.

Within the valve chamber 46 are a pair of seat seals for receiving the rotatable valve element 48 sandwiched between them. These seat seals are shown as an inlet seat seal 66 and an outlet seat seal 68. In order to position and to retain these respective seals 66, 68 in their seated relationship against the ball element 48, the fitting 16, as seen most clearly enlarged in FIG. 8, is shown having an annular recess 70 in its downstream protruding end portion 34. This annular recess 70 receives and holds the inlet seat seal 66. This annular recess 70 has a radial surface 72 which presses against the upstream side of the inlet seat seal 66 in the assembled valve 14, as shown in FIG. 4.

For providing an appropriate pressure of the seat seals 66, 68 against opposite sides of ball element 48 sandwiched between these seals in assembled relationship, the radial back surface 72 of recess 70 is spaced a predetermined suitable distance "F" from a radial shoulder surface 74 adjacent to the circular rim 40 and also is spaced a predetermined suitable distance "G" from the downstream radial face 76 of a rim encircling the recess 70. The distance F is predetermined in relation to the position of the upstream end 78 of the housing 30 encircling the socket 32. The shoulder surface 74 of fitting 16 is assembled abutting against this end 78 of the housing. The distance G is predetermined in relation to the axial position of an annular shoulder 80 at the downstream end of the socket 32 and in relation to the desired position of the seat seal 66 to be held against the ball 48 rotatable about axis 82. The radial face 76 of the rim around the recess 70 is assembled adjacent to this annular shoulder 80.

The tail-tube 15 is shown having an upstream end 27 which is formed flat in a plane perpendicular to the longitudinal central axis 29 of the fitting 16, and the inlet-tail-tube has an axial length "L" (FIG. 7) of at least ⅝ths of an inch as measured from the upstream end 13 of the main body portion 38 to the flat end 27, for enabling this tail-tube to be inserted fully into the socket 24 of valve 3 or 7. Such a compression-connection type of socket 24 often is about ⅜ths of an inch deep, and there needs to be sufficient additional available length of the tail-tube for accommodating thereon the loose compression sleeve 23 and the loose compression nut 22 in readiness for making the connection to valve 3 or 7. Preferably the length L is at least about one inch. The flat end 27 seats squarely down against the bottom of the socket 24. It is preferred that the length L be less than about 1¼ of an inch.

In order to make connection with a flex tube 10 or 10', the externally threaded boss 17 projecting downstream from the valve housing 30 has a downstream termination with a truncated conical surface 65 contiguous with the downstream end of the outlet passage 44. This truncated conical surface 65 flares outwardly in the downstream direction adapted for engaging a compression sleeve such as the compression sleeve 64 for making a compression-connection 67 (FIG. 3) between the flex tube 10 or 10' and the boss 17. In this compression connection 67 the compression sleeve 64 encircles the flex tube, and a compression nut 9 or 9' engages the external threads on the boss 17 for wedging the compression sleeve 64 in contact with the truncated conical surface 65 (FIG. 4) and also wedging this sleeve in compression gripping relationship around the flex tube 10 or 10'.

It is noted that after the plumber has completed repairing or replacing the fixture 12, the plumber may turn the handle 4 of the valve 3 or 7 into its full-flow position and then may permanently remove the handle 4 so that a homeowner or subsequent plumber will use only the new valve 14 as the operable replacement shut-off valve.

The present inventor is not claiming inventorship of ball-type valves per se. The inventor is claiming patentable novelty in the overall structural configuration and interrelationships embodied in this trouble-shooting, quick shut-off valve 14 with its inlet-tail-tube which is conveniently adapted to be directly mounted onto a defective Speedy valve 3 or 7 in series relationship immediately downstream from the defective valve and with its externally-threaded boss 17 and truncated conical surface 65 adapted for making a compression connection directly with a flex tube 10 or 10'.

In addition to the convenience of employing this valve 14 to solve the difficulties of dealing with a defective valve 3 or 7, this quick shut-off valve is quite well suited for use as a high-quality, easy-to-install, premium valve unit for incorporation in a new plumbing installation employing compression-connection fittings.

Figure 9:
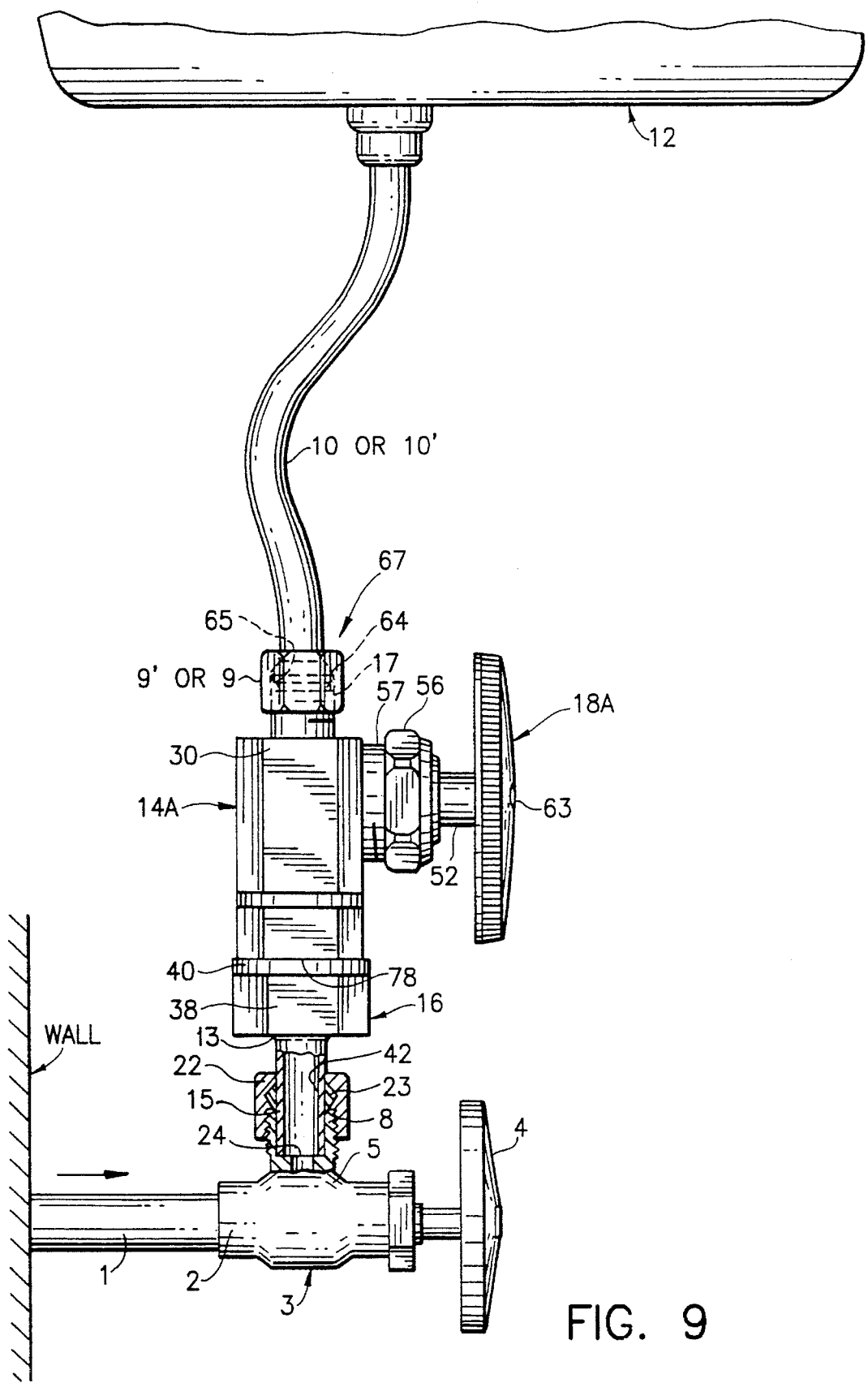
FIG. 9 is an elevational view similar to FIG. 3 showing another embodiment of a shut-off valve embodying the present invention having an inlet-tail-tube mounted into the compression-fitting outlet of a defective "Speedy" valve.
Figure 10:
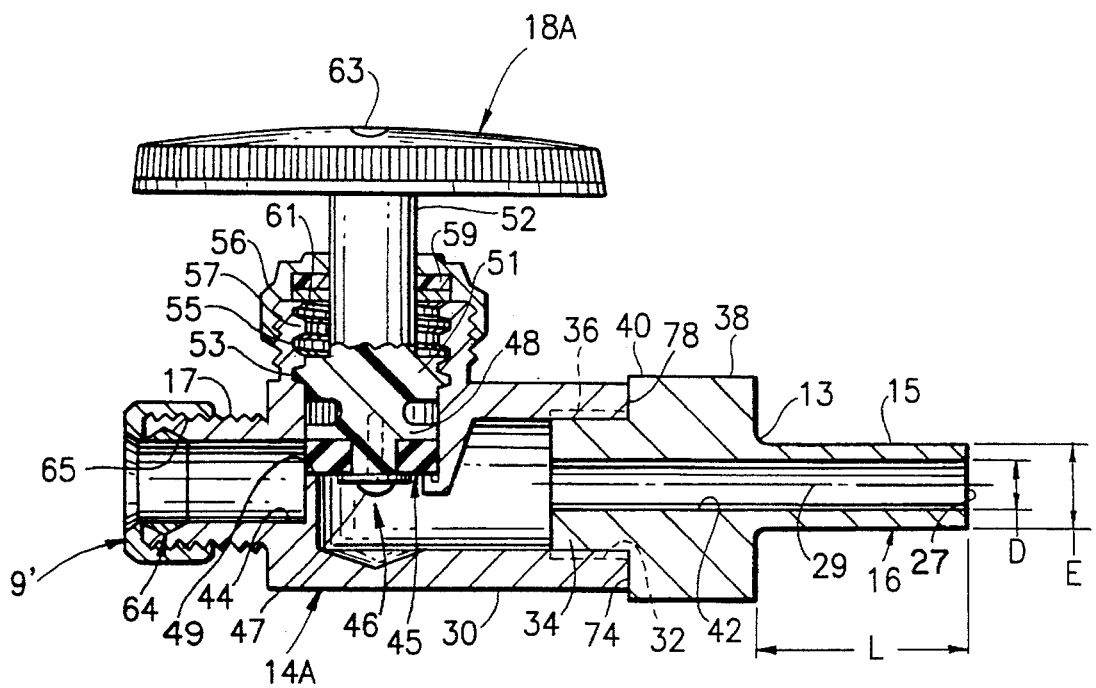
FIG. 10 is an enlarged longitudinal sectional view of the shut-off valve seen in FIG. 9.

In FIGS. 9 and 10, another embodiment of the invention is a trouble-shooting, shut-off valve 14A having a suitably soft inlet-tail-tube 15 on a fitting 16 at its inlet end 13. This inlet-tail-tube 15 defines the inlet passage 42 into the valve 14 and is adapted to be inserted directly into the socket 24 (FIG. 9) within the externally-threaded male outlet compression-connection-type end 8 of a defective angle-stop "Speedy" valve 3 as is illustrated in FIG. 9 or into the socket in the outlet compression-connection-type end 8 of a defective straight-through "Speedy" valve 7 (FIG. 2). As soon as the inlet-tail-tube 15 has been inserted fully, as shown in FIG. 9, into a socket outlet 24 located in the outlet end 8 of the defective Speedy valve 3 or 7, a compression-connection-type nut 22 with a compression sleeve 23 is used quickly and easily for connecting the inlet-tail-tube 15 to the compression-connection-type outlet 8.

In use and operation of the shut-off valve 14A, a plumber first makes sure that the valve handle 18A on a rotatable stem 52 is turned to its fully open position.

As explained previously, the reason for initially fully opening this valve 14A is that the plumber has already determined that the existing "Speedy" valve 3 or 7 is defective. Significant flow is passing through this existing valve in spite of vigorous efforts by the plumber to shut it off. When significant leakage flow is occurring, it is much easier to install an open valve 14A, because the plumber thereby avoids fighting water pressure which otherwise would be resisting insertion of the inlet-tail-tube 15 into the socket 24 (FIG. 9) within the externally threaded outlet end 8 of the leaking valve 3 or 7. It is quite difficult to attempt to install a closed valve against water pressure of an existing flow, and such an attempt to fight against pressure may consume considerable time and may cause unwanted sprays of water to occur. Consequently, the new valve 14A needs to be open to accommodate leakage flow for facilitating installation of the new valve as quickly as possible while avoiding opposition from water pressure. The plumber wants to save time while uncontrolled leakage flow through a defective valve is occurring and wants to avoid needless spraying of leaking water.

With the new valve 14A fully opened and at hand, and with a compression nut 22 and a compression sleeve 23 positioned in readiness on the short inlet-tail-tube 15, the plumber as quickly as possible unscrews the nut 9 (FIGS. 1 or 2) of the compression fitting which previously has been attaching the flex-line 10 to the threaded outlet 8 of the valve 3 or 7. As soon as this nut 9 begins to be loosened, there will be an amount of leakage (spurting or spraying) of water from between the sleeve and the threaded outlet 8, depending on the amount of leakage flow through defective valve 3 or 7. Quickly, the lower end of flex-line 10, together with the disconnected compression nut 9 and its compression sleeve, are temporarily shifted out of the way.

As soon as the lower end of flex-line 10 has been removed from the socket 24 (FIG. 9) and has been moved aside, the inlet-tail-tube 15 of the new valve 14A, already prepared by putting thereon an encircling compression sleeve 23 with an encircling compression nut 22 resting loosely over the compression sleeve, as mentioned above, is inserted promptly into the empty socket 24. The compression nut 22 is quickly tightened for completing connection of the inlet-tail-tube 15 to the outlet end 8 of the defective valve 3 or 7. Then, the handle 18A is turned rapidly for shutting off all leakage due to defective valve 3 or 7. Now that the leakage flow has been stopped, the plumber can proceed to make the needed repairs or replacement in fixture 12.

The plumber may decide to re-use the existing flex-line 10 and existing compression nut 9 with a compression sleeve (not seen) which is already in place on the flex-line within the interior of this compression nut 9. Alternatively, the plumber may decide to use a new flex-line 10' (FIG. 3) and a new compression nut 9' (FIG. 4) with an accompanying new compression sleeve 64 for connecting the valve 14A to the repaired or replaced plumbing fixture 12.

As shown in FIG. 10, the trouble-shooting, shut-off valve 14A includes a valve housing 30. The inlet tail-tube fitting 16 forms the inlet end 13 for this valve, being mounted in a threaded socket 32 in the valve housing 30. The fitting 16 has a downstream protruding end portion 34 with external screw threads 36 adapted to be screwed into this threaded socket 32.

In order to facilitate assembly of the inlet tail-tube fitting 16 into its socket 32, the main body portion 38 of the fitting 16 may be hexagonal for providing a wrench-engageable region 38 (FIG. 9). A circular rim 40 (FIG. 9) and a contiguous shoulder surface 74 on the main body portion of the fitting 16 abuts against the upstream end 78 of the valve housing 30. An axial bore inlet passage 42 extends through fitting 16, and it has an inside diameter "D" corresponding with the conventional inside diameter (I.D.) of a flex-line 10 or 10', for example having a nominal I.D. in a range from about 0.32 of an inch to about 0.21 of an inch, depending upon whether the inlet-tail-tube 15 is made from copper or plastic, or the like, suitably soft malleable material. A copper tail-tube 15 has a bore 42 in the upper portion of this size range, while a plastic tail-tube has a bore in the lower portion of this size range for providing a slightly thicker tubing wall of plastic as compared with copper. The outside diameter "E" of the inlet tail-tube 15 corresponds with the conventional outside diameter (O.D.) of a flex-line 10 or 10', for example having a nominal O.D. of 3/8ths of an inch (a nominal value of 0.375 of an inch). Thus, the O.D. and physical characteristics of the tail-tube 15 are very suitable for making a compression-type connection thereto using a conventional compression nut 22 (FIG. 9) with a conventional compression sleeve 23.

To make the inlet tail-tube 15 well suited for applying a compression sleeve 23 and compression nut 22 thereto, this tail-tube is fabricated from suitably soft, malleable material, for example such as copper or plastic similar to copper, for example such as the plastic used for fabricating a flex-line 10 or 10'. A convenient method of manufacturing this suitably soft, malleable tail-tube 15 is to make the whole fitting 16 as an integral component all fabricated from the same material, as is shown in FIGS. 4 and 7. Thus, the fitting 16 as a whole may be softer than the material, for example brass, of which the valve housing 30 may be fabricated.

Alternatively, the tail-tube 15 itself may be fabricated from a desired material suitable for a compression connection thereto, for example such as soft copper, and then this tail-tube may be permanently suitably bonded at the inlet end region 13 to the main body portion 38 of the fitting 16, which may be fabricated from material corresponding with the material of which the housing 30 is fabricated.

The valve housing 30 has an outlet passage 44, and between this outlet passage and the inlet passage 42 is a valve chamber 46, which interconnects the inlet and outlet passages 42 and 44. Within the valve chamber 46 is positioned a movable valve element 48, for example shown as a plug, having resilient washer 45 secured to the lower end of the plug 48 by a machine screw 47. FIG. 10 shows the closed ("OFF") position of the valve 14A in which the resilient washer 45 presses down onto a lip seat 49 in the valve chamber 46, thereby blocking communication between the inlet and outlet passages 42 and 44. A rotatable valve stem 52 is mechanically coupled to an axially-movable rotatable plunger actuator 51 having external threads 53 engaging internal threads 55 within a boss 57 on the valve housing 30. This plunger actuator 51 is connected to the valve plug 48, thus, turning the handle 18A in one direction moves the plug washer 45 against the lip seat 49 for shutting the valve 14A, and turning it in the other direction lifts the plug washer 45 off of the lip seat 49 for opening the valve for providing communication between inlet and outlet passages 42 and 44. The valve stem 52 is shown captured in the valve housing 30 by a nut sleeve 56 screwed onto the threaded boss 57 in which the valve stem 52 is located. A sealing washer or gasket or packing 59 is held around the valve stem by the nut sleeve 56, and this sealing means 59 seats upon an annular washer 61 engaging against the upper end of the threaded boss 57. A machine screw 63 is threaded into the outer end of the valve stem 52 for securing the handle 18A to the valve stem.

The inlet-tail-tube fitting 16 has a radial shoulder surface 74 contiguous with the circular rim 40, and this radial surface 74 of fitting 16 is assembled abutting against an upstream end 78 of the housing 30 encircling the threaded socket 32.

The tail-tube 15 is shown having an upstream end 27 which is formed flat in a plane perpendicular to the longitudinal central axis 29 of the fitting 16, and the inlet-tail-tube 15 has an axial length "L" (FIG. 10) of at least 5/8ths of an inch, as measured from the upstream end 13 of the main body portion 38 to the flat end 27, for enabling this tail-tube to be inserted fully into the socket 24 of valve 3 or 7. Such a compression-connection type of socket 24 often is about 3/8ths of an inch deep, and there needs to be sufficient additional available length of the tail-tube for accommodating thereon the loose sleeve 23 and the loose nut 22 in readiness for making the connection to valve 3 or 7. Preferably the length L is at least about one inch. The flat end 27 seats down squarely against the bottom of the socket 24.

In order to make connection with a flex tube 10 or 10', the externally threaded boss 17 projecting downstream from the valve housing 30 has a downstream termination with a truncated conical surface 65 contiguous with the downstream end of the outlet passage 44. This truncated conical surface 65 flares outwardly in the downstream direction adapted for engaging a compression sleeve such as the compression sleeve 64 for making a compression-connection 67 (FIG. 11) between the flex tube 10 or 10' and the boss 17. In this compression connection 67 the compression sleeve 64 encircles the flex tube, and a compression nut 9 or 9' engages the external threads on the boss 17 for wedging the compression sleeve 64 in contact with the truncated conical surface 65 (FIG. 11) and also wedging this sleeve in compression gripping relationship around the flex tube 10 or 10'.

It is noted that after the plumber has completed repairing or replacing the fixture 12, the plumber may turn the handle 4 of the valve 3 or 7 into its full-flow position and then may permanently remove the handle 4 so that a homeowner or subsequent plumber will use only the new valve 14A as the new replacement shut-off valve.

The present inventor is not claiming inventorship of resilient plug washer and lip seat types of valves per se. The inventor is claiming patentable novelty in the overall structural configuration and interrelationships embodied in this trouble-shooting, shut-off valve 14A with its inlet-tail-tube 15 which is conveniently adapted to be directly mounted into a socket 24 of a compression-connection fitting type outlet 8 of a defective Speedy valve 3 or 7 immediately downstream from the defective valve and with its externally-threaded boss 17 and truncated conical surface 65 adapted for making a compression connection directly with a flex tube 10 or 10'.

In addition to the convenience of employing this valve 14A to solve the difficulties of dealing with a defective valve 3 or 7, this shut-off valve 14A is quite well suited for use as a high-quality, easy-to-install, premium valve unit for incorporation in a new plumbing installation employing compression-connection fittings.

Figure 12:
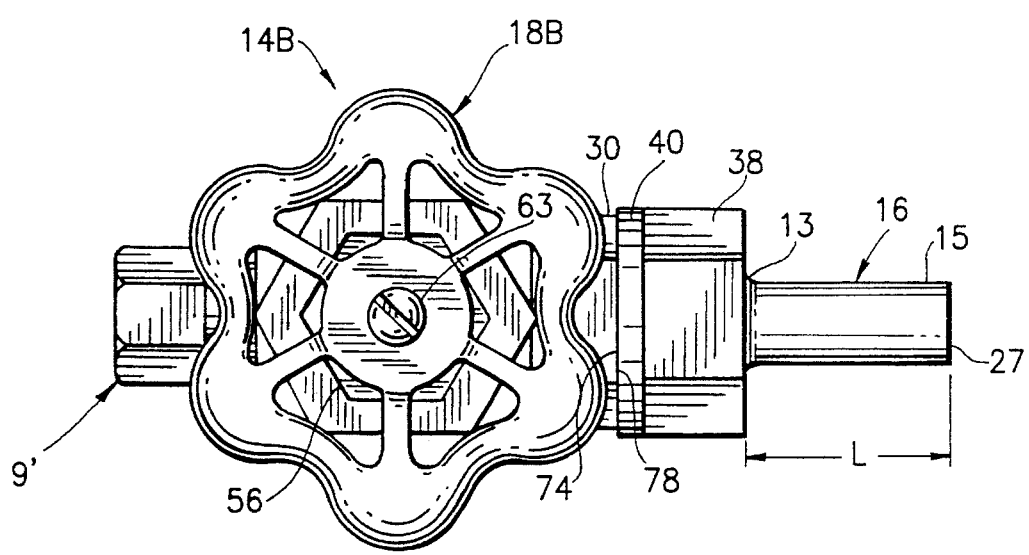
FIG. 12 is an enlarged top view of the shut-off valve seen in FIG. 11.
Figure 11:
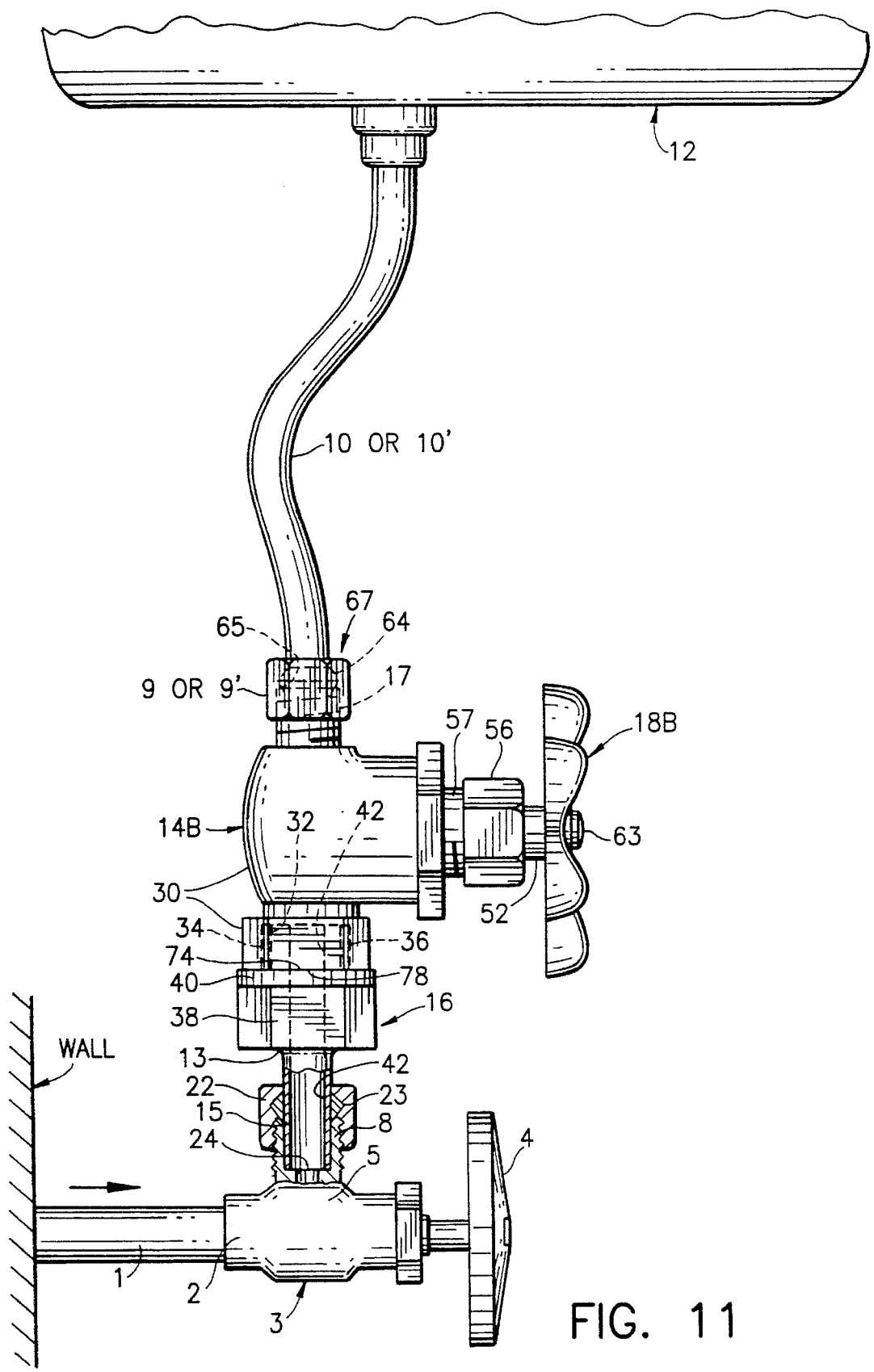
FIG. 11 is an elevational view similar to FIG. 9 showing another embodiment of a shut-off valve embodying the present invention having an inlet-tail-tube mounted into a compression fitting outlet of a defective "Speedy" valve.

FIGS. 11 and 12 show another valve 14B embodying the present invention. This valve 14B is a gate valve having a slidable gate member (not shown) as is known in the art. This gate member is slid between open and closed positions by threaded screw actuation occurring within the boss 57 and accomplished by turning a handle 18B. This threaded screw actuation within the boss 57 of the valve 14B is similar to that shown in FIG. 10 involving an axially movable-rotatable plunger having external screw threads engaging with internal screw threads within the boss 57 as is known in the art. The inlet-tail-tube fitting 16 is shown as being substantially identical with the inlet-tail-tube fitting 16 shown in FIGS. 9 and 10.

The inlet-tail-tube fitting 16 in FIG. 11 is shown having a downstream protruding end portion 34 with external screw threads 36 engaging in an internally threaded socket 32 in an upstream end 38 of the valve housing 30. The radial shoulder surface 74 of the inlet-tail-tube fitting which is contiguous with circular rim 40 abuts against the upstream end 78 of the housing 30.

As shown in FIG. 11, when the valve 14B is installed onto a defective valve 3 or 7, the inlet-tail-tube 15 of the valve 14B is inserted directly into the socket 24 of a compression-connection fitting type of outlet 8 of a defective valve 3 or 7 immediately downstream from this defective valve with the square end 27 seating down squarely into the bottom of the socket 24 and with a compression sleeve 23 and a compression nut 22 being used for making a compression connection to the externally-threaded end 8 of the defective valve.

Since other changes and modifications varied to fit particular plumbing installation operating requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A trouble-shooting shut-off valve mountable onto an outlet end of a defective water shut-off valve, said defective water shut-off valve being of a type having an outlet end with external threads on said outlet end and with a compression-connection outlet socket in said outlet end, said trouble-shooting shut-off valve including a valve housing having a valve chamber therein with an inlet passage leading to said valve chamber and an outlet passage leading from said valve chamber with valve means in said valve chamber movable to a closed position for blocking communication between the inlet and outlet passages and movable to an open position for opening communication between the inlet and outlet passages and with a handle coupled to said valve means for selectively moving said valve means to the closed position and to the open position, said trouble-shooting shut-off valve being characterized by:

a boss projecting downstream from the valve housing and having external threads thereon, said boss encircling said outlet passage, said boss having a downstream termination with a truncated conical surface within said boss contiguous with a downstream end of said outlet passage, said truncated conical surface flaring outwardly in a downstream direction adapted for engaging a compression sleeve for making a compression-connection between said boss and a flex tube inserted into said outlet passage with a compression nut and a compression sleeve encircling the flex tube and the compression nut engaging said external threads on the boss for wedging the compression sleeve in contact with said truncated conical surface and also wedging the compression sleeve in compression gripping relationship around the flex tube, said valve housing having an upstream end with an internally-threaded socket within said upstream end, said socket encircling said inlet passage, an inlet-tail-tube fitting, said inlet-tail-tube fitting having a main body portion, said main body portion having a downstream protruding end portion with external threads thereon, said main body portion having a shoulder surface encircling said downstream protruding end portion, said downstream protruding end portion having its external threads screwed into said internally-threaded socket with said shoulder surface abutting against said upstream end of the valve housing, said main body portion having an inlet-tail-tube projecting in an upstream direction therefrom, said inlet-tail-tube fitting having an axial bore therein extending through said downstream protruding end portion and through said main body portion and through said inlet-tail-tube, said axial bore in said inlet-tail-tube fitting communicating with said inlet passage in said valve housing for forming an upstream extension of said inlet passage, said inlet-tail-tube having an outside diameter E for fitting into the compression-connection outlet socket of the defective water shut-off valve, said inlet-tail-tube being formed of material suitable for making a compression connection thereto by a compression sleeve encircling said inlet-tail-tube, said inlet-tail-tube projecting upstream a distance L from said main body portion of the fitting to an inlet end thereof, and said length L being less than about 1¼ of an inch and being sufficient for having on said inlet-tail-tube a loose compression sleeve and a loose compression nut with the inlet-tail-tube inserted fully into said compression-connection outlet socket of the defective water shut-off valve for making a compression connection between said inlet-tail-tube and the outlet end of the defective water shut-off valve by screwing the compression nut onto said external threads on said outlet end for squeezing the compression sleeve into said outlet socket and onto the inlet-tail-tube.

2. A trouble-shooting shut-off valve as claimed in claim 1, in which:

said inlet-tail-tube fitting is formed of material which is softer than material of which said valve housing is formed.

3. A trouble-shooting shut-off valve as claimed in claim 2, in which:

said outside diameter E of said inlet-tail-tube is about ⅜ths of an inch.

4. A trouble-shooting shut-off valve as claimed in claim 1, in which said main body portion and said downstream protruding end portion of said inlet-tail-tube fitting are formed of material similar to material of which said valve housing is formed, said inlet-tail-tube is formed of material softer than said main body portion and said downstream projecting end portion, and said inlet-tail-tube is permanently bonded to an upstream end of said main body portion.

5. A trouble-shooting shut-off valve as claimed in claim 4, in which:

said outside diameter E of said inlet-tail-tube is about ⅜ths of an inch.

6. A trouble-shooting shut-off valve as claimed in claim 1, in which:

said outside diameter E of said inlet-tail-tube is about ⅜ths of an inch.

7. A trouble-shooting shut-off valve as claimed in claim 1, in which:

said main body portion of said inlet-tail-tube fitting has a hexagonal external shape as seen looking along a longitudinal central axis of the inlet-tail-tube.

8. A trouble-shooting shut-off valve as claimed in claim 1, in which:

said inlet end of said inlet-tail-tube is flat in a plane perpendicular to a central longitudinal axis of the inlet-tail-tube for inserting fully into the outlet socket of a defective water shut-off valve said inlet-tail-tube.

9. A trouble-shooting shut-off valve mountable onto an outlet end of a defective water shut-off valve, said defective water shut-off valve being of a type having an outlet end with external threads on said outlet end and having a compression-connection outlet socket in said outlet end, said trouble-shooting shut-off valve including a valve housing having a valve chamber therein with an inlet passage leading to said valve chamber and an outlet passage leading from said valve chamber with valve means in said valve chamber movable to a closed position for blocking communication between the inlet and outlet passages and movable to an open position for opening communication between the inlet and outlet passages, with a handle coupled to said valve means for selectively moving said valve means to the closed position or to the open position, said trouble-shooting shut-off valve comprising:

a boss projecting downstream from the valve housing and having external threads thereon, said boss encircling said outlet passage, said boss having a downstream end with a truncated conical surface within said downstream end, said truncated conical surface encircling the outlet passage at a downstream end of said outlet passage, said truncated conical surface flaring outwardly in a downstream direction adapted for engaging a compression sleeve for making a compression connection between a flex tube inserted into said boss and said boss wherein a compression nut and a compression sleeve encircle the flex tube and the compression nut engages said external threads on the boss for squeezing the compression sleeve against said truncated conical surface and also squeezing the compression sleeve in compression gripping relationship around the flex tube, said valve housing having an upstream end with an internally-threaded socket located within said upstream end of the valve housing, said socket encircling said inlet passage, an inlet-tail-tube fitting mounted onto said upstream end of the valve housing, said fitting having a main body portion, said main body portion having a downstream end portion with external threads thereon, said downstream end portion having its external threads screwed into said internally-threaded socket for mounting said fitting onto the upstream end of the valve housing for forming an integral component of the trouble-shooting shut-off valve, said main body portion having an inlet-tail-tube projecting in an upstream direction therefrom, said fitting having an axial bore therein extending through said downstream end portion and through said main body portion and through said inlet-tail-tube, said axial bore communicating with said inlet passage in said valve housing for forming an upstream extension of said inlet passage, said inlet-tail-tube having an outside diameter E for fitting into the compression-connection outlet socket of the defective water shut-off valve, said inlet-tail-tube being formed of material suitable for making a compression connection thereto by a compression sleeve around said inlet-tail-tube, said inlet-tail-tube projecting upstream a distance L from said main body portion of the fitting to an inlet end thereof, and said length L being sufficient for said inlet-tail-tube to be inserted fully into the outlet socket with a compression nut and a compression sleeve loosely on the inlet-tail-tube for making a compression connection between said inlet-tail-tube and the outlet end of the defective water shut-off valve by screwing the compression nut onto said external threads on said outlet end for squeezing the compression sleeve into the outlet socket and onto the inlet-tail-tube.

10. A trouble-shooting shut-off valve as claimed in claim 9, in which:

said inlet-tail-tube fitting is formed of material which is softer than material of which said valve housing is formed.

11. A trouble-shooting shut-off valve as claimed in claim 10, in which:

said outside diameter E of said inlet-tail-tube is about ⅜ths of an inch.

12. A trouble-shooting shut-off valve as claimed in claim 9, in which said main body portion and said downstream end portion of said inlet-tail-tube fitting are formed of material similar to material of which said valve housing is formed, said inlet-tail-tube is formed of material suitable for making a compression connection thereto and which is different from the material of which said main body portion and said downstream end portion are formed, and said inlet-tail-tube is permanently bonded to an upstream end of said main body portion.

13. A trouble-shooting shut-off valve as claimed in claim 12, in which:

said outside diameter E of said inlet-tail-tube is about ⅜ths of an inch.

14. A trouble-shooting shut-off valve as claimed in claim 9, in which:

said outside diameter E of said inlet-tail-tube is about ⅜ths of an inch.

15. A trouble-shooting shut-off valve as claimed in claim 9, in which:

said inlet end of said inlet-tail-tube is flat in a plane perpendicular to a central longitudinal axis of the inlet-tail-tube for inserting fully into the outlet socket of a defective water shut-off valve said inlet-tail-tube.

16. A trouble-shooting shut-off valve as claimed in claim 15, in which:

said length L of said inlet-tail-tube is less than about 1¼ inches.

* * * * *